(12) United States Patent
Sakamoto et al.

(10) Patent No.: US 6,188,738 B1
(45) Date of Patent: Feb. 13, 2001

(54) CLOCK EXTRACTION CIRCUIT

(75) Inventors: Hisaya Sakamoto; Akihiko Sugata; Akimitsu Miyazaki; Tetsuya Kiyonaga, all of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/041,777

(22) Filed: Mar. 13, 1998

(30) Foreign Application Priority Data

Oct. 16, 1997 (JP) .................................................. 9-283634

(51) Int. Cl.[7] ....................................................... H04L 7/00
(52) U.S. Cl. .......................... 375/371; 375/214; 375/317; 375/355; 375/361; 327/175; 369/124
(58) Field of Search ............................. 327/165; 375/371, 375/359, 360, 361, 355, 214, 317; 369/124

(56) References Cited

U.S. PATENT DOCUMENTS

| | | | |
|---|---|---|---|
| 4,019,048 | * | 4/1977 | Maione et al. ........................ 359/176 |
| 4,078,157 | * | 3/1978 | Lender et al. ........................ 375/214 |
| 4,078,159 | * | 3/1978 | Lender et al. ........................ 375/214 |
| 4,761,797 | * | 8/1988 | Bickers .................................. 375/214 |
| 4,805,197 | * | 2/1989 | Jagt et al. ............................ 375/361 |
| 4,837,778 | * | 6/1989 | Trumpp ................................. 375/214 |
| 4,932,038 | * | 6/1990 | Windus ................................. 375/214 |
| 5,088,106 | * | 2/1992 | Kitamura et al. ..................... 375/214 |
| 5,197,082 | * | 3/1993 | Uda et al. ............................ 375/214 |
| 5,383,046 | * | 1/1995 | Tomofuji et al. .................... 359/176 |
| 5,619,541 | * | 4/1997 | Brunt et al. .......................... 375/360 |
| 5,652,767 | * | 7/1997 | Kiyonaga et al. .................... 375/317 |
| 5,736,875 | * | 4/1998 | Sakamoto et al. ..................... 327/74 |

FOREIGN PATENT DOCUMENTS

| | | | |
|---|---|---|---|
| 63-229931 | 9/1988 | (JP) | ................................. H04L/7/02 |
| 2-68523 | 5/1990 | (JP) | ................................. H03K/5/08 |
| 7-221612 | 8/1995 | (JP) | ................................. H03K/5/08 |

* cited by examiner

*Primary Examiner*—Stephen Chin
*Assistant Examiner*—Paul N Rupert
(74) *Attorney, Agent, or Firm*—Staas & Halsey LLP

(57) ABSTRACT

Disclosed is a clock extraction circuit for extracting a clock signal which furnishes timing for discriminating a data signal, from the data signal. The clock extraction circuit has a timing extraction unit for extracting the clock signal from the data signal, and a filter, which is provided in front of the timing extraction unit, having an upper limited frequency sufficiently lower than the bit rate of the data. The data signal is input to the timing extraction unit via the filter.

7 Claims, 15 Drawing Sheets

WAVEFORM OF LIGHT TRANSMISSION
(BEFORE TRANSMISSION)

CLOCK EXTRACTION CIRCUIT

BACKGROUND OF THE INVENTION

1. Field of the Invention

This invention relates to a clock extraction circuit in the light receiver of a high-speed optical communication system. More particularly, the invention relates to a clock extraction circuit for extracting a clock signal, which furnishes the discrimination timing of a data signal, from the data signal.

2. Description of the Related Art

The light receiver of a high-speed optical communication system converts a data waveform, which has become distorted by distortion or noise produced by transmission, to a digital signal having a clean waveform. The light receiver performs so-called data and clock regeneration. When data is to be regenerated, the light receiver extracts and regenerates a clock signal from the received data signal and performs the regeneration of the data by a discriminator using the generation timing of the clock signal as a reference.

FIG. 12 is a block diagram showing the construction of a light receiver in an optical communication system. The light receiver includes a light-receiving element 1 for converting a light signal to an electric signal, an equalizing amplifier circuit 2 for equalizing and amplifying a 10-Gbps data signal, for example, output by the light-receiving element 1, a timing extraction unit 3 for extracting a clock signal, which has a frequency the same as that of the bit rate, from the data signal that has been equalized and amplified, and a discriminator 4 for discriminating the data signal using the clock signal extracted from timing extraction unit 3. In operation, a light signal that has arrived through an optical fiber is converted to an electric signal by the light-receiving element 1. The electric signal is equalized and amplified by the equalizing amplifier circuit 2. The timing extraction unit 3 extracts a clock signal CLK from the equalized waveform to trigger the discriminator 4. The latter determines whether the equalized waveform is indicative of "0" or "1" at the sampling timing, thereby reproducing the original code pulses (data) and outputting the same. Since there is a change in delay time in regard to transmission through the transmission line, the discriminator 4 is triggered by a clock signal synchronized to the received data signal.

FIG. 13 is a block diagram showing the construction of the timing extraction unit 3. The timing extraction unit includes a data edge detector 110 for detecting leading and trailing edges of the data signal, a bandpass filter (BPF) 111, which has a center frequency identical with the bit rate of the data and a characteristic exhibiting a very high Q, generally on the order of 1000, and a limiter amplifier 112 for amplifying and shaping the waveform of the BPF output. FIG. 14 is a diagram showing the f characteristic of the PF 111, where $f_0$ represents the center frequency of the BPF and $\Delta f$ the 3dB bandwidth of the BPF 111. Accordingly, Q is given by the following:

$$Q = f_0/\Delta f \quad (1)$$

Though the circuits are not shown, the data edge detector 110 includes a branching circuit for branching the data signal in two directions, a delay circuit for delaying, by a prescribed length of time, one of the branched data signals, and an EX-OR (exclusive-OR) circuit for taking the exclusive-OR between the data signal and the output signal of the delay circuit to generate an edge signal having pulses at the leading and trailing edges of the data signal.

FIG. 15 is a waveform diagram showing the operation of the components in the timing extraction unit 3. The data edge detector 110 generates pulses at the leading and trailing edges of the data signal, the bandpass filter 111 extracts the clock component, which has a frequency identical with the bit rate of the data, from the output of the data edge detector 110, and the limiter amplifier 112 amplifies and shapes the waveform of the clock component.

If the duty cycle of the input data signal deviates from 100%, the output of the BPF takes on a small value. As shown in FIG. 16, duty cycle is the ratio of the duration $T_H$ of the high (H) level at 50% amplitude to the duration T of one time slot and is represented by the following equation:

$$\text{duty cycle} = (T_H/T) \cdot 100 (\%) \quad (2)$$

FIG. 17 is a waveform diagram showing the operation of the components in the timing extraction unit in a case where the duty cycle of the input signal has deviated from 100%. Here the BPF output takes on a small value and so does the output of the limiter amplifier, as a result of which the clock component decreases. More specifically, when duty cycle decreases, the positions of the detection pulses at the leading edges of the data are delayed and the positions of the detection pulses at the trailing edges of the data are advanced. The clock component is extracted following the combination of these pulses. Though the phase of the extracted clock component does not change, a portion that is canceled out occurs. The extracted clock component decreases for this reason.

The relationship between output amplitude Vout of the BPF and a phase shift $\theta$ conforming to the duty cycle of the input data is given by the following equation:

$$V_{out} = \cos\theta \times \sin\omega t \quad (3)$$

where we have $\omega = 2\pi f_0$ $\theta = \pi \times \Delta t/T$ and $\Delta t$ represents the temporal deviation of the edges due to the fluctuation in duty cycle and T denotes one time slot $(=1/f_0)$. Equation (3) indicates that when the duty cycle of the input waveform is 100% ($\theta = 0$), Vout attains its maximum value. Regardless of whether duty cycle increases or decreases, Vout decreases and Vout=0 is established at a duty cycle of $100\pm50(\%)$ ($\theta = \pm\pi/2$). FIG. 18 is a graph showing the relationship between the input waveform duty cycle and the BPF output amplitude based upon Equation (3).

When the bit rate is greater than several gigabits per second (Gbps) and the transmission distance is several dozen to several hundred kilometers in optical digital communication, a fluctuation in duty cycle waveform occurs owing to a fluctuation in optical wavelength at the leading and trailing edges, as illustrated in FIG. 19. In FIG. 19, (1) illustrates the transmission waveform in a case where duty cycle has increased beyond 100%, and (2) illustrates the transmission waveform in a case where duty cycle has decreased below 100%.

Thus, since a waveform having fluctuating duty cycle enters the light receiver, the amplitude of the clock signal from the bandpass filter in the timing extraction unit decreases (i.e., the clock component decreases) and the quality of the clock declines, resulting in an increase in jitter and missing clock pulses. This means that the data cannot be reproduced correctly in the discriminator.

SUMMARY OF THE INVENTION

Accordingly, an object of the present invention is to so arrange it that even if a data waveform having fluctuating duty cycle is applied as an input, a clock signal having excellent quality can be extracted by improving duty cycle.

Another object of the present invention is to so arrange it that data can be reproduced correctly by preventing degradation of clock quality.

In accordance with the present invention, the foregoing objects are attained by providing a clock extraction circuit for extracting a clock signal which furnishes timing for discriminating a data signal, from the data signal comprising a timing extraction unit for extracting the clock signal from the data signal, and a filter, which is provided in front of the timing extraction unit, having an upper limited frequency sufficiently lower than the bit rate of the data, wherein the data signal is input to the timing extraction unit via the filter. By thus providing a filter whose upper limited frequency is sufficiently lower than the bit rate of the data, duty cycle is improved when the data is input to the filter. As a result, a clock signal exhibiting excellent quality is obtained from the timing extraction unit.

In accordance with the present invention, the foregoing objects are attained by providing a clock extraction circuit for extracting a clock signal which furnishes timing for discriminating a data signal, from the data signal, comprising a timing extraction unit for extracting the clock signal from the data signal, and a slicer amplifier, which is provided in front of the timing extraction unit, for varying slice level to improve the duty of the data signal, wherein the data signal is input to the timing extraction unit via the slicer amplifier. By thus varying the slice level of the slicer amplifier, the duty cycle of the output data signal can be changed. Accordingly, by varying the slice level in dependence upon the duty cycle of the input data signal, duty cycle can be improved and a clock signal exhibiting excellent quality can be generated by the timing extraction unit.

By further providing a filter having an upper limited frequency sufficiently lower than the bit rate of the data in front of the slicer amplifier in this arrangement, the amount of duty cycle compensation with respect to the slice level can be increased further.

Further, by applying control to feed back the slice level based upon the mean value (which is proportional to the duty cycle) of the slicer amplifier output, the duty cycle of the output data signal can be made the optimum value (e.g., 100%), thus making it possible to generate a clock signal having even better quality.

Further, by taking the logical product of the slicer amplifier output and the extracted clock signal output by the timing extraction unit and adopting the mean value of the logical product as the duty cycle, the duty can be measured accurately irrespective of the number of "1"s and "0"s in the data signal. This makes it possible to diminish duty cycle error due to feedback control.

Other features and advantages of the present invention will be apparent from the following description taken in conjunction with the accompanying drawings

BRIEF DESCRIPTION OF THE DRAWINGS

DESCRIPTION OF THE PREFERRED EMBODIMENTS (A) Embodiment using data bandpass filter (a) First embodiment FIG. 1 is a block diagram showing a light receiver according to a first embodiment of the present invention using a data bandpass filter (a wide-band filter). The light receiver includes a light-receiving element 11 for converting a light signal to an electric signal, an equalizing amplifier circuit 12 for equalizing and amplifying a data signal of frequency $f_0$ (=10 Gbps) output by the light-receiving element 11, a data bandpass filter (wide-band filter) 13 whose upper limited frequency fc is sufficiently lower than the frequency $f_0$ (GHz), where the bit rate of the data is $f_0$ (Gbps), a timing extraction unit 14, which has the construction shown in FIG. 13, for extracting a clock signal CLK whose frequency is the same as that of the bit rate from the data signal output by the wide-band filter 13, and a discriminator 15 for discriminating the data signal using the clock signal CLK extracted from timing extraction unit 14.

If the upper limited frequency fc of the wide-band filter 13 is made sufficiently lower than the data bit rate $f_0$, the duty cycle of the data signal that has passed through the wide-band filter 13 can be improved. FIG. 2 is a diagram useful in describing output waveform when the cut-off frequency fc of the wide-band filter 13 is changed. Specifically, FIG. 2 illustrates output waveforms when cut-off frequency fc is equal to (1) $f_0$, (2) $0.8f_0$, (3) $0.6f_0$ and (4) $0.4f_0$ with an input waveform duty cycle of 70%. It should be obvious from FIG. 2 that more compensation is made for duty cycle (i.e., duty cycle is improved) as the filter band is reduced, though this is accompanied by an increase of interference in the amplitude (i.e., a decrease in amplitude). Accordingly, the cut-off frequency fc of the wide-band filter 13 is made $0.4f_0$.

Figure 1:
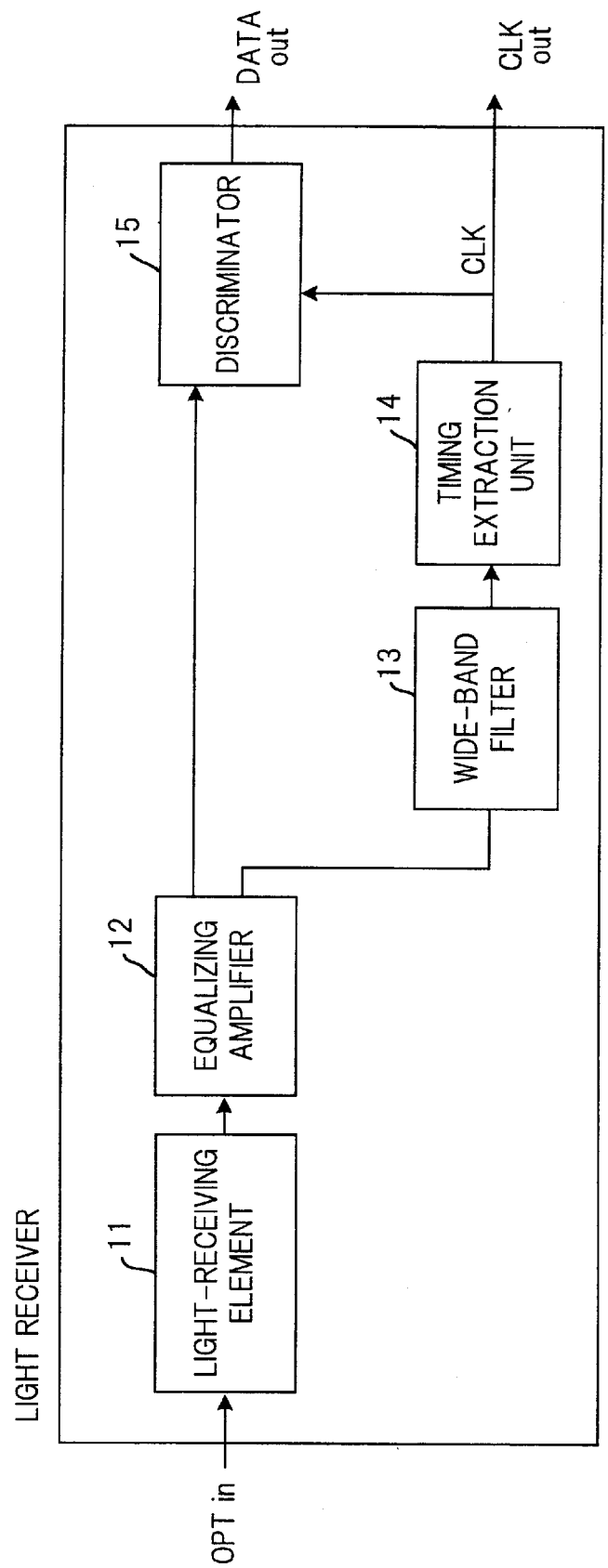
FIG. 1 is a block diagram showing a light receiver according to a first embodiment using a data bandpass filter.
Figure 2:
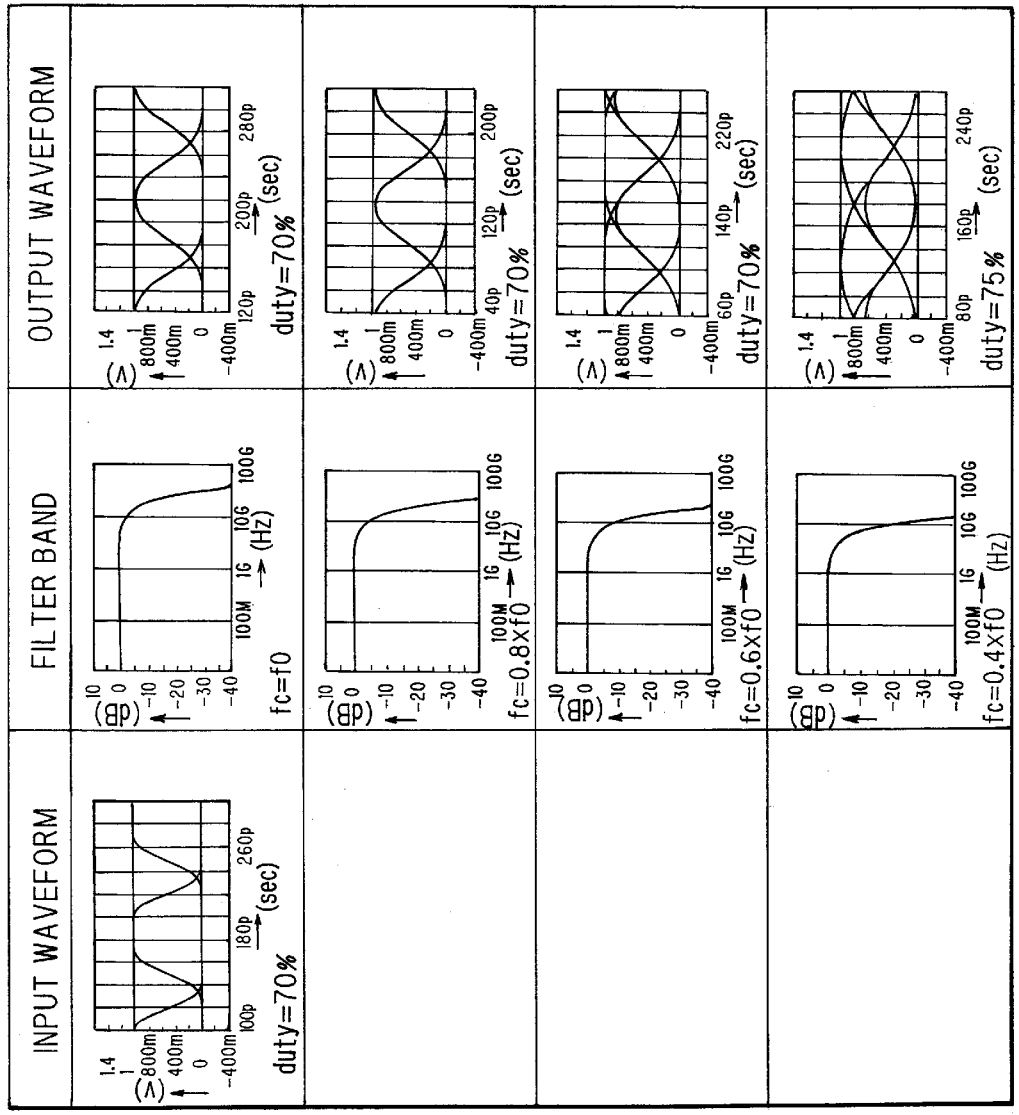
FIG. 2 is a diagram useful in describing the relationship between a data bandpass filter and output waveform.

A light signal that has arrived through an optical fiber is converted to an electric signal by the light-receiving receiving element 11. The electric signal is equalized and amplified by the equalizing amplifier circuit 12 and the resulting signal is input to the discriminator 15 and wide-band filter 13. The data signal that has entered the wide-band filter 13 is improved in terms of duty cycle and is then input to the timing extraction unit 14. The latter extracts the clock signal CLK using the data signal of improved duty cycle and thus triggers the discriminator 15. The latter determines whether the equalized waveform is indicative of "0" or "1" at the timings of the leading edges of the clock signal CLK, thereby reproducing the original code pulses (data) and outputting the same.

Thus, since the data signal is input to the timing extraction unit 14 upon having its duty cycle improved, a clock signal having excellent quality is obtained from the timing extraction unit 14.

(b) Modification

Figure 3:
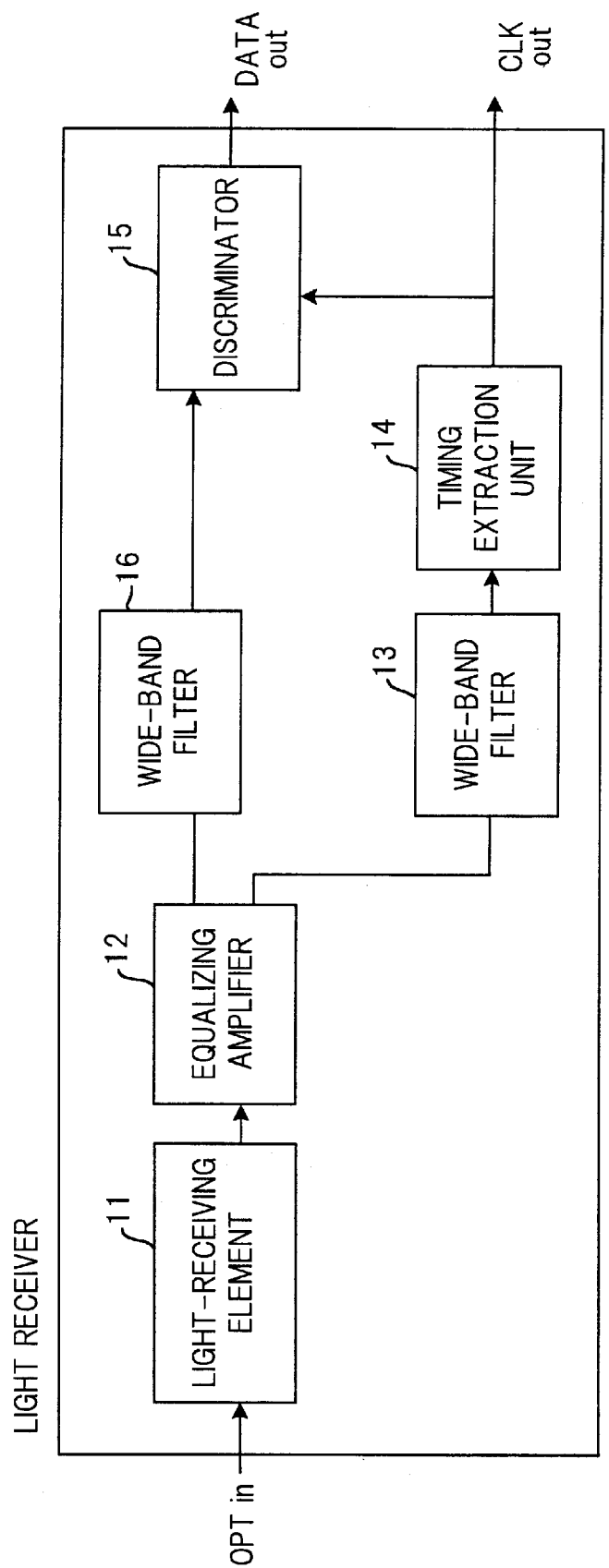
FIG. 3 is a block diagram showing a modification of the first embodiment.

FIG. 3 is a block diagram showing a modification of the light receiver according to the first embodiment. Components identical with those of the first embodiment shown in FIG. 1 are designated by like reference characters. This modification differs from the first embodiment in that a second wide-band filter 16 is provided, in front of the discriminator 15. The band of the wide-band filter 16 is decided by balancing data interference and the quantity of noise elimination. Ordinarily, the upper limited frequency fc is made $0.8f_0$.

Since the wide-band filter 16 is provided in front of the discriminator 15 as well, the duty cycle of the data signal input to the discriminator 15 can be improved. As a consequence, the data and the leading edge of the clock can be synchronized correctly and the discriminator 15 is capable of discriminating and regenerating the data correctly.

(B) Embodiments using slicer amplifier (a) Second embodiment

Figure 4:
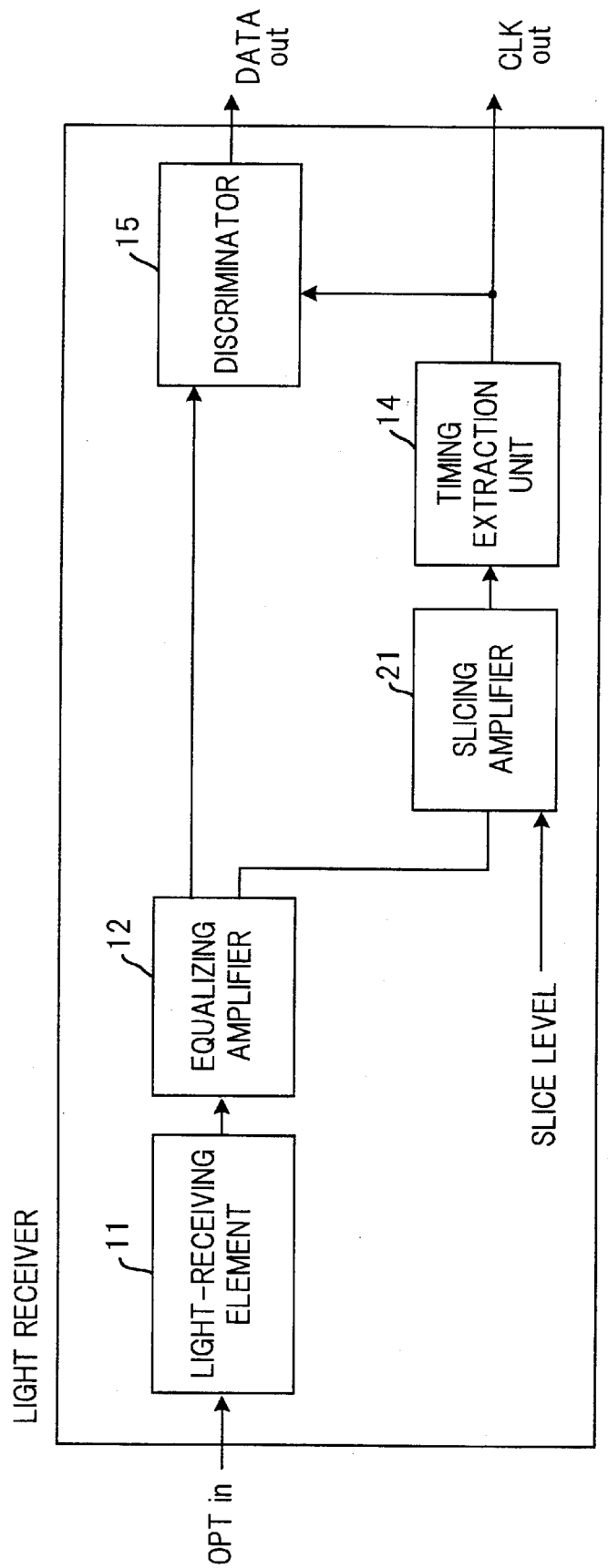
FIG. 4 is a block diagram showing a light receiver according to a second embodiment using a slicer amplifier.
Figure 13:
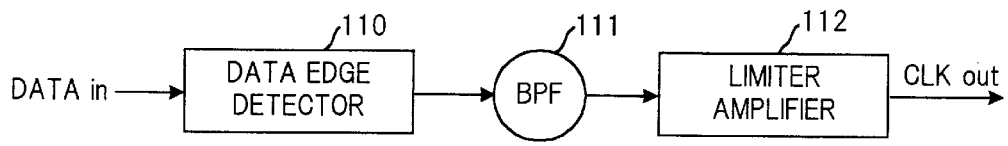
FIG. 13 is a block diagram showing the construction of a timing extraction unit according to the prior art.
Figure 14:
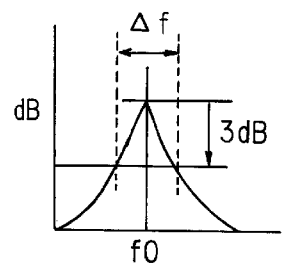
FIG. 14 is a characteristic diagram showing the f characteristic of a bandpass filter.
Figure 15:
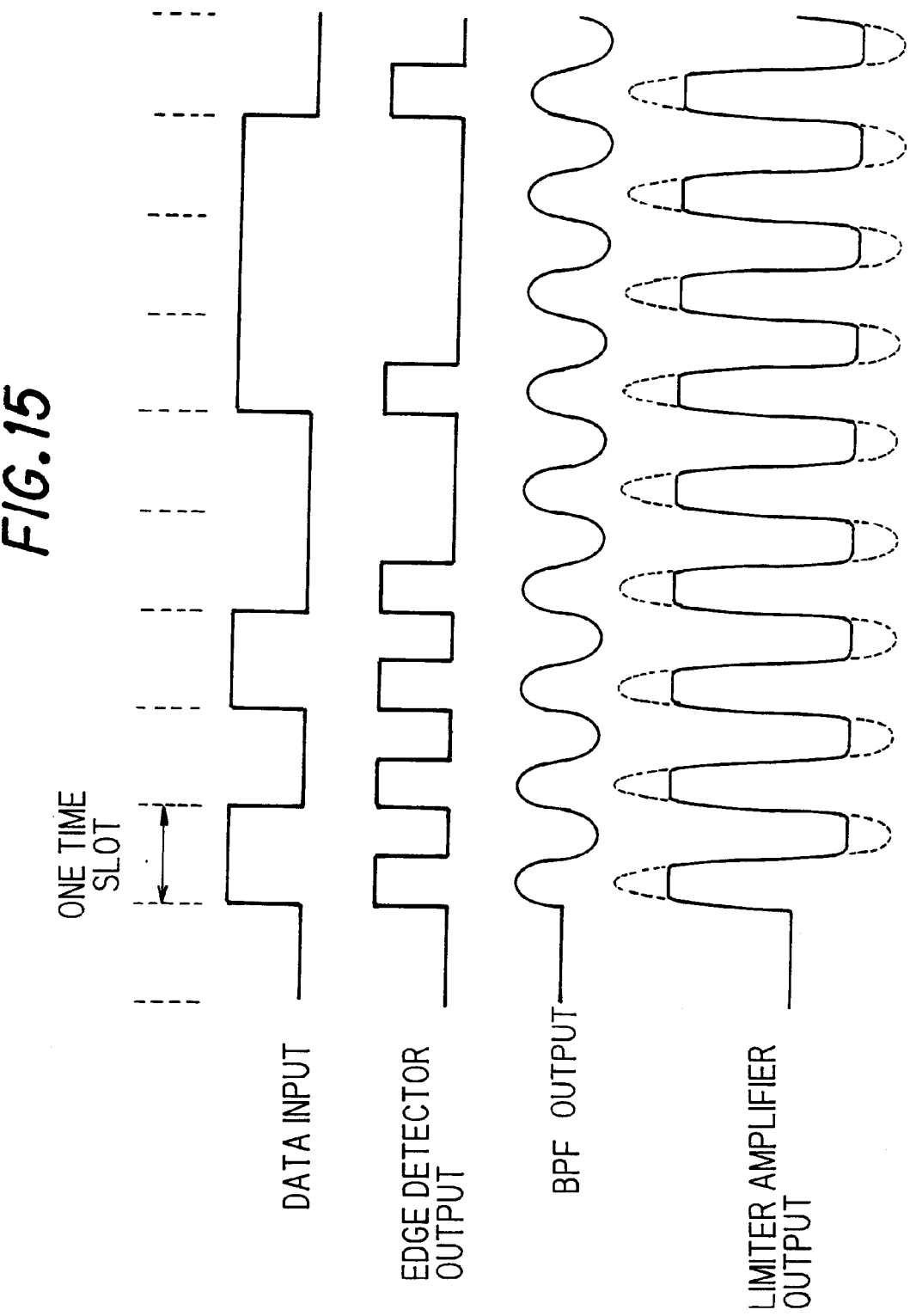
FIG. 15 is a time chart of the timing extraction unit according to the prior art.
Figure 16:
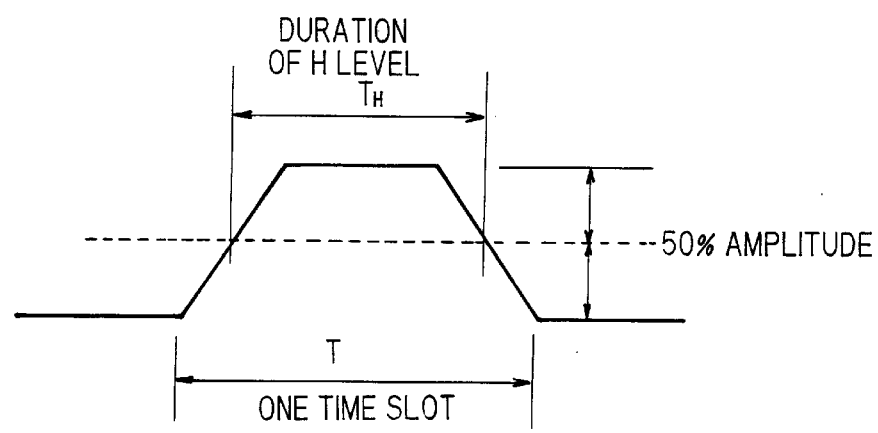
FIG. 16 is a diagram useful in describing duty cycle.
Figure 17:
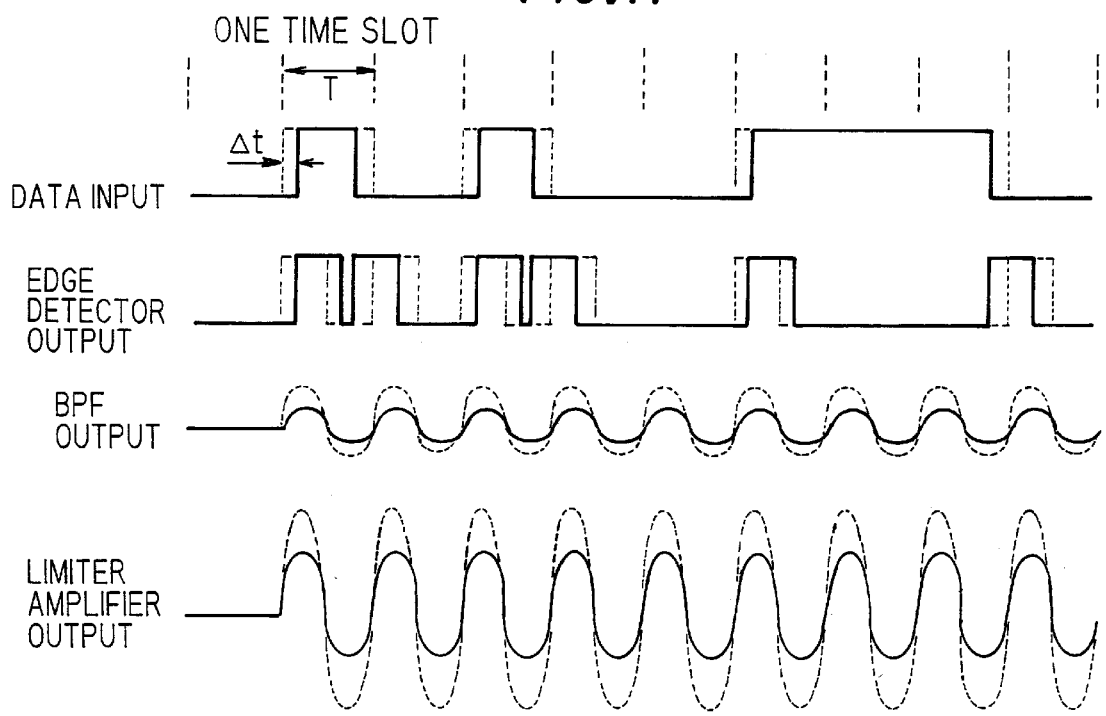
FIG. 17 is a time chart of the timing extraction unit when duty cycle fluctuates.
Figure 18:
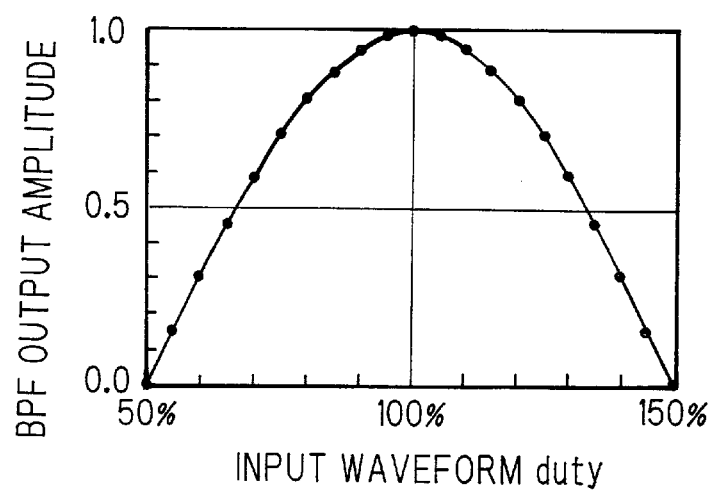
FIG. 18 is a diagram showing the relationship between input waveform duty cycle and bandpass filter output.
Figure 19:
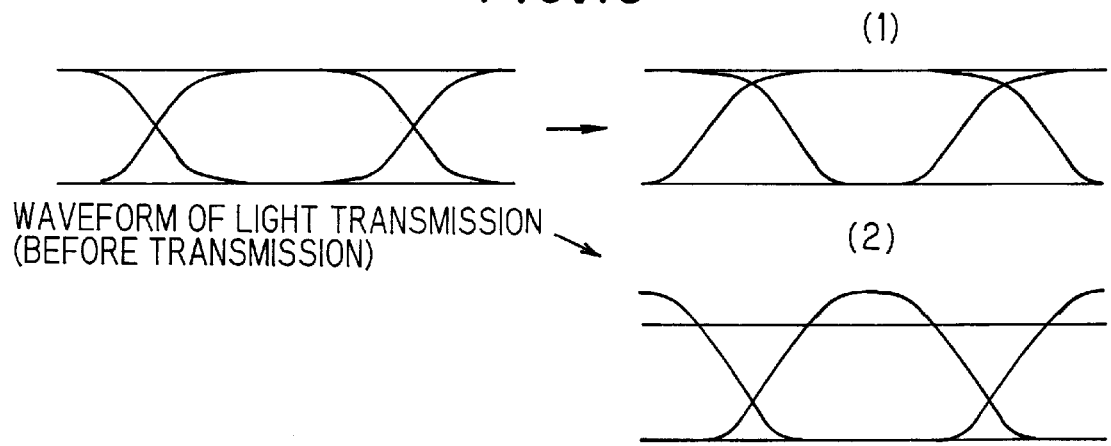
FIG. 19 shows optical waveform before and after transmission.

FIG. 4 is a block diagram showing a light receiver according to a second embodiment of the present invention using a slicer amplifier. The light receiver includes the light-receiving element 11 for converting a light signal to an electric signal, the equalizing amplifier circuit 12 for equalizing and amplifying a data signal of, e.g., 10 Gbps output by the light-receiving element 11, a slicer amplifier 21 for varying the slice level to improve the duty cycle of the data signal, the timing extraction unit 14, which has the construction shown in FIG. 13, for extracting a clock signal CLK whose frequency is the same as that of the bit rate from the data signal output by the slicer amplifier 21, and a discriminator 15 for discriminating the data signal using the clock signal CLK output by the timing extraction unit 14.

Figure 5:
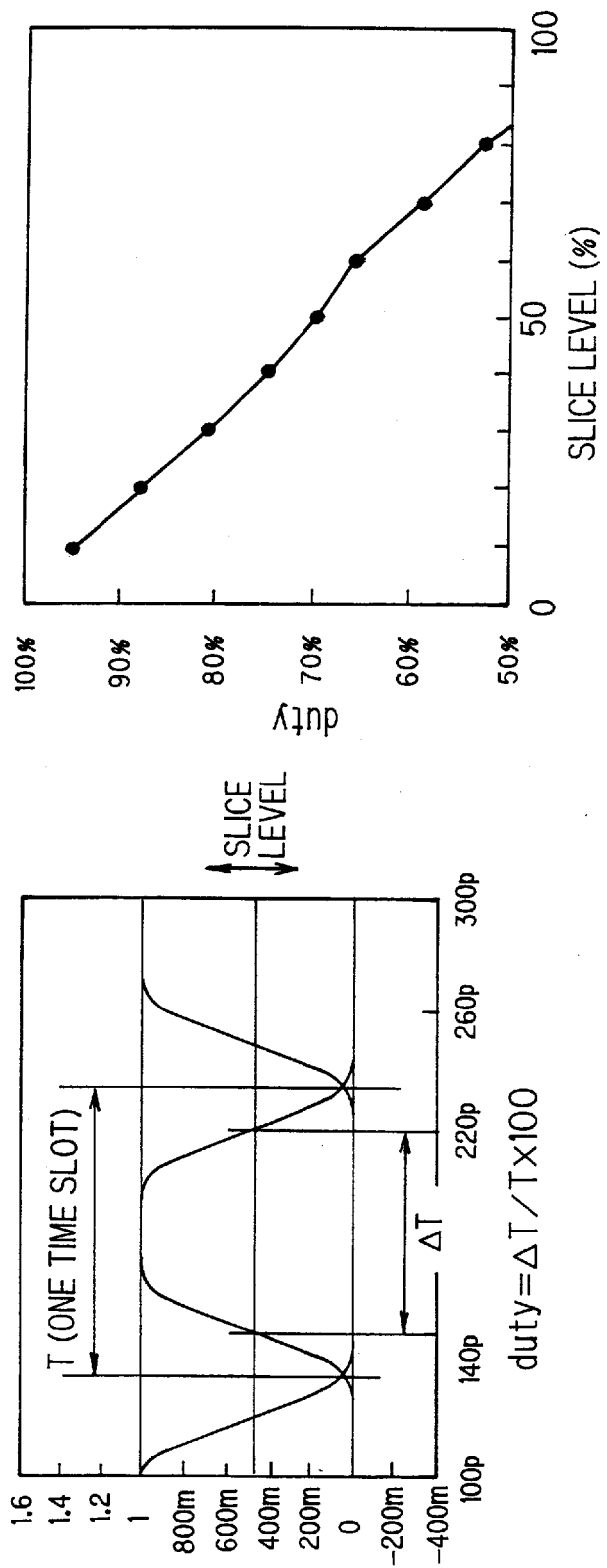
FIG. 5A is a waveform diagram of an input signal and FIG. 5B is a diagram useful in describing the relationship between slice level and duty cycle.

As shown in FIG. 5A, varying the slice level makes it possible to vary ΔT so that the duty [=(ΔT/T)×100] of the data signal can be changed. FIG. 5B is a diagram showing the relationship between slice level and duty cycle when peak level (1000 mV) of the input waveform in FIG. 5A is taken as being 100. When the duty cycle of the input data waveform is 70%, therefore, making the slice level 20% of the peak level enables the duty cycle to be improved to about 90%. Accordingly, the duty cycle of the input data waveform is measured, the slice level at, say, a duty cycle of 90% is found and the slice level is set in the slicer amplifier 21.

A light signal that has arrived through an optical fiber is converted to an electric signal by the light-receiving element 11. The electric signal is equalized and amplified by the equalizing amplifier circuit 12 and the resulting signal is input to the discriminator 15 and slicer amplifier 21. The slicer amplifier 21 slices the input data signal at the set slice level, improves the duty cycle of the data signal and then inputs the data signal to the timing extraction unit 14. The latter extracts the clock signal CLK using the data signal of improved duty and thus triggers the discriminator 15. The latter determines whether the equalized waveform is indicative of "0" or "1" at the timings of the leading edges of the clock signal CLK, thereby reproducing the original code pulses (data) and outputting the same.

Thus, since the data signal is input to the timing extraction unit 14 upon having its duty cycle improved, a clock signal having excellent quality is obtained from the timing extraction unit 14.

(b) First modification

The foregoing relates to a case where a slice level at which the duty cycle will be 90% is measured in advance and the slice level is set in the slicer amplifier. However, it is also possible to adopt an arrangement in which the mean value of the equalized output of the equalizing amplifier circuit 12 is obtained, the duty cycle of the input data signal is measured based upon the mean value and the slice level is set in such a manner that the duty cycle will attain the target duty (e.g., 90%). If this arrangement is adopted, a slice level conforming to the duty cycle can be set automatically to obtain the desired duty cycle.

It should be noted that the number of "1"s and the number of "0"s in the data signal are equal owing to scrambling processing. The mean value of the data signal, therefore, is proportional to the duty cycle. That is, the mean value contains the duty information of the data signal.

(c) Second modification

Figure 6:
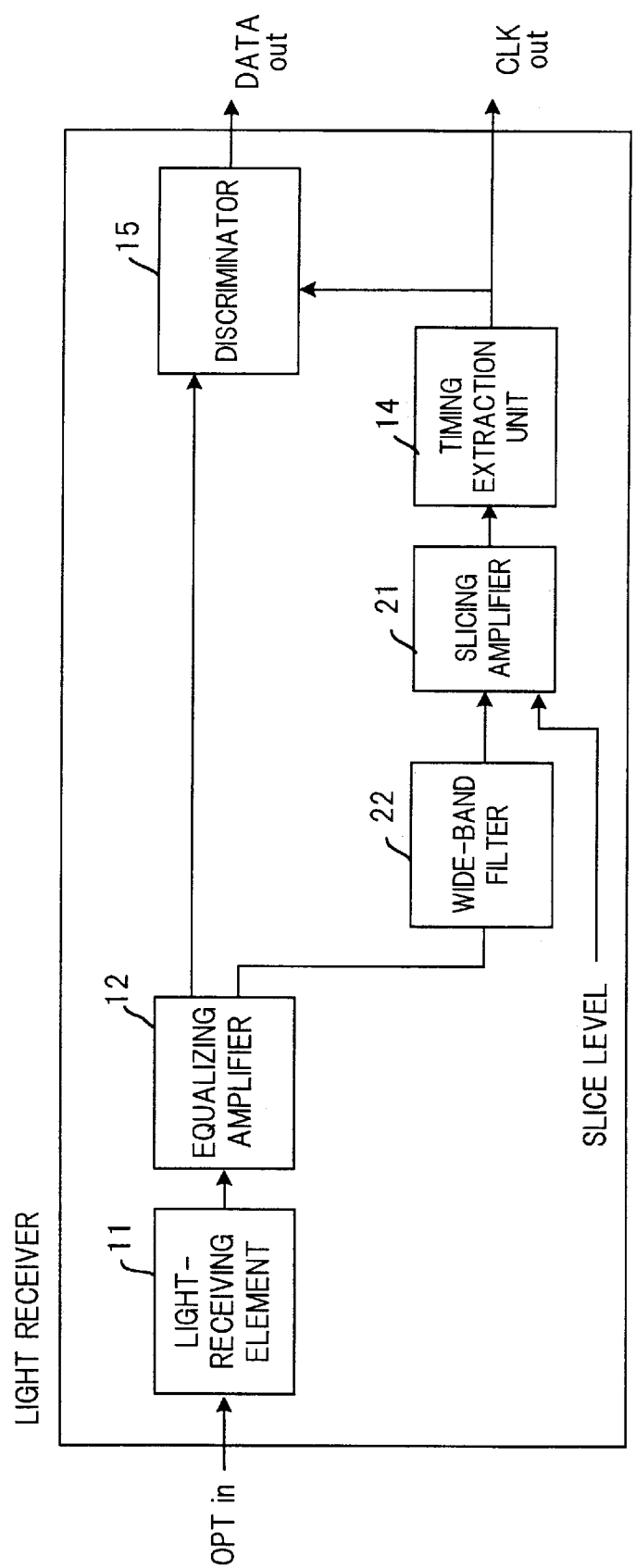
FIG. 6 is a block diagram showing a modification of the second embodiment.

FIG. 6 is a block diagram showing a second modification of the second embodiment. Components identical with those of the second embodiment shown in FIG. 4 are designated by like reference characters. This modification differs from the second embodiment in that the wide-band filter 13 is provided in front of the silicer amplifier 21.

Figure 7:
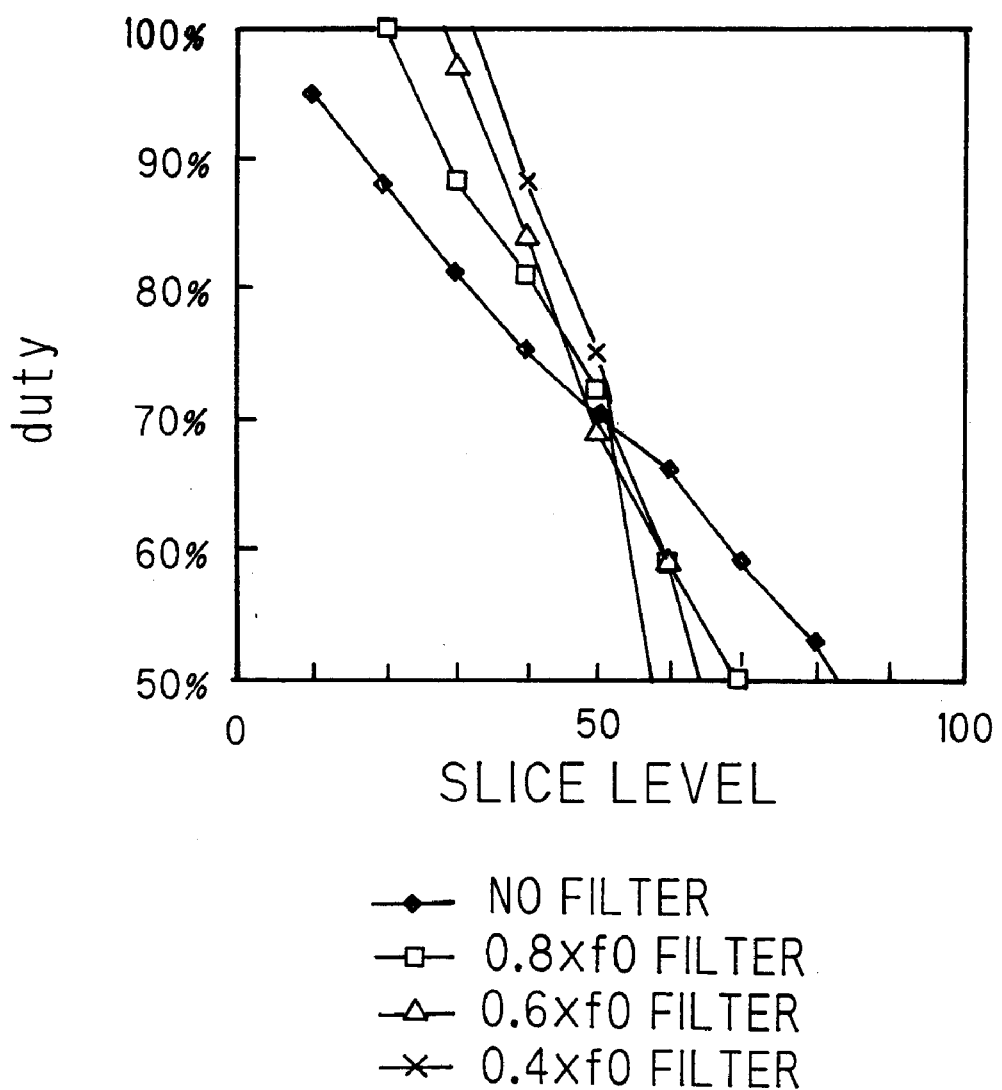
FIG. 7 is a diagram useful in describing the relationship between slice level and the duty cycle of a slicer amplifier output waveform when cut-off frequency of a bandpass filter has been changed.

If the wide-band filter 13 is thus provided at the input to the slicer amplifier 21, the amount of duty cycle compensation with respect to the slice level can be increases, as shown in FIG. 7.

(C) Embodiment with feedback control of slice level (a) Third embodiment

Figure 8:
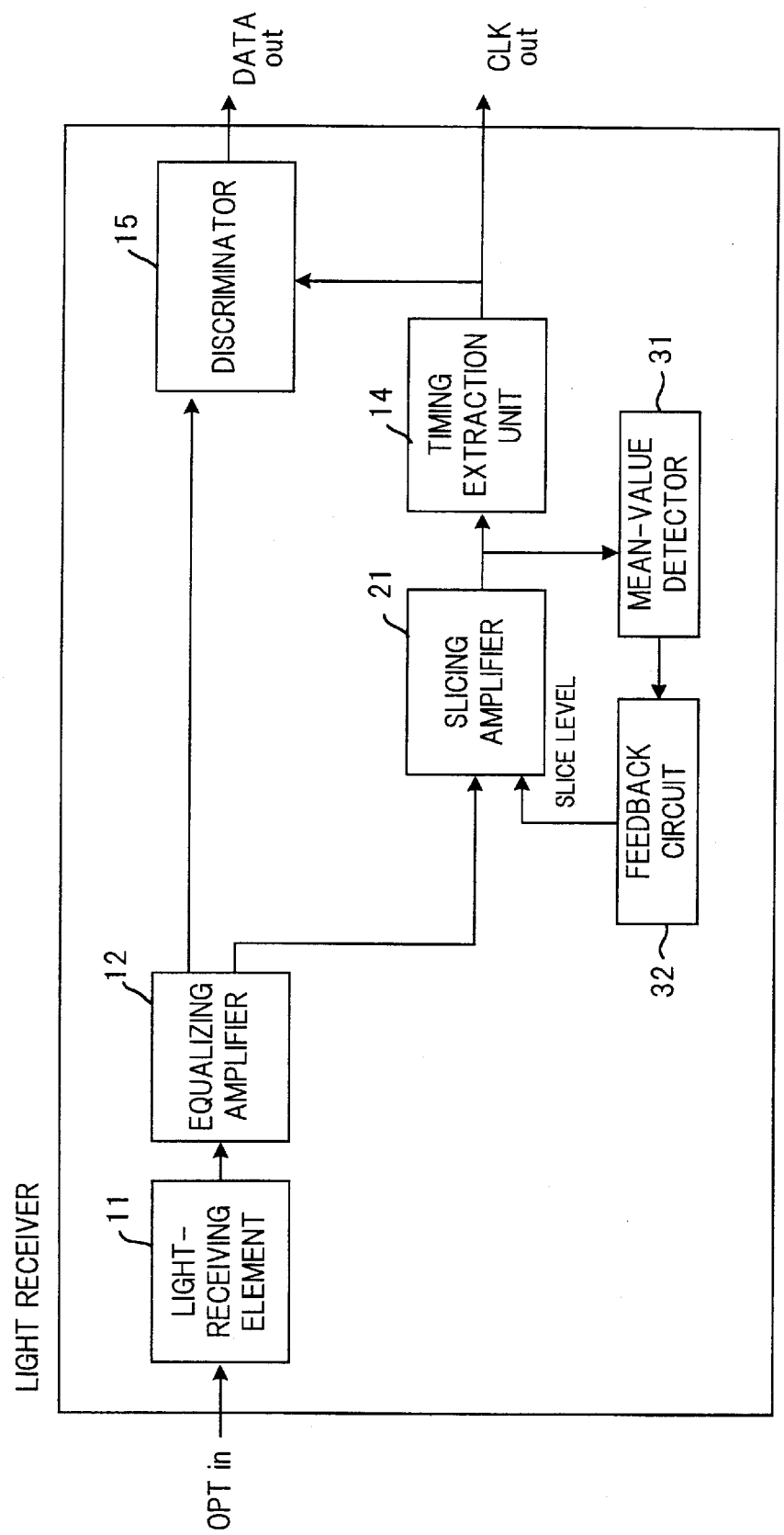
FIG. 8 is a block diagram showing a third embodiment in which slice level is fed back.

FIG. 8 is a block diagram showing a third embodiment in which slice level is fed back. The light receiver includes the light-receiving element 11 for converting a light signal to an electric signal, the equalizing amplifier circuit 12 for equalizing and amplifying a data signal of, e.g., 10 Gbps output by the light-receiving element 11, the slicer amplifier 21 for varying the slice level to improve the duty cycle of the data signal, the timing extraction unit 14, which has the construction shown in FIG. 13, for extracting a clock signal CLK whose frequency is the same as that of the bit rate from the data signal output by the slicer amplifier 21, the discriminator 15 for discriminating the data signal using the clock signal CLK output by the timing extraction unit 14, a mean-value circuit 31 such as an integrator circuit for outputting the mean value of the slicer amplifier 21, and a feedback circuit 32 for controlling the slice level based upon the mean value and improving the duty cycle of the data signal to 100%.

The number of "1"s and the number of "0"s in the data signal are equal owing to scrambling processing. The mean value of the data signal, therefore, is proportional to the duty cycle. Accordingly, the mean value of the data signal output by the slicer amplifier 21 is obtained by the mean-value circuit 31 and the slice level of the slicer amplifier 21 is controlled by the feedback circuit 32 in such a manner that the mean value, i.e., the duty cycle, will be enlarged. The duty cycle of the data signal output by the slicer amplifier 21 is improved by this feedback control and approaches 100%.

As a result, the timing extraction unit 14 extracts the clock signal CLK using the data signal of improved duty and inputs the clock signal to the discriminator 15. The latter determines whether the equalized waveform is indicative of "0" or "1" at the timings of the leading edges of the clock signal CLK, thereby reproducing the original code pulses (data) and outputting the same.

Thus, since the data signal is input to the timing extraction unit 14 upon having its duty cycle improved, a clock signal having excellent quality is obtained from the timing extraction unit 14.

(b) Modification

Figure 9:
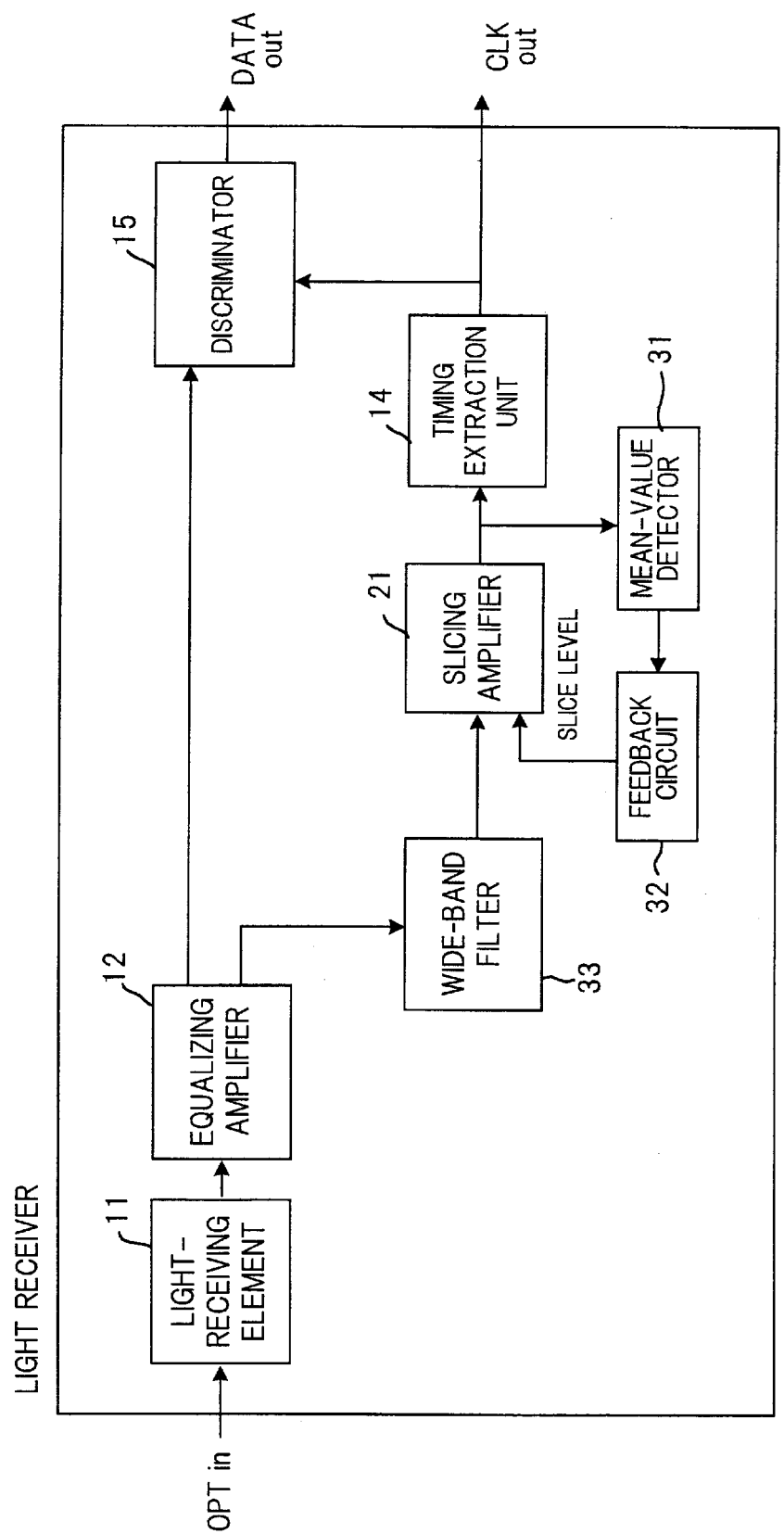
FIG. 9 is a block diagram showing a modification of the third embodiment.

FIG. 9 is a block diagram showing a modification of the third embodiment. Components identical with those of the third embodiment are designated by like reference characters. This modification differs from the third embodiment in that a wide-band filter 33 is provided in front of the slicer amplifier 21.

If the wide-band filter 33 is thus provided at the input to the slicer amplifier 21, the amount of duty cycle compensation with respect to the slice level can be increased, as shown in FIG. 7. As a result, loop gain can be increased and it is possible to reduce duty error in the output waveform.

(c) Duty cycle detecting circuit using extracted clock

According to the embodiment of FIG. 8, the mean value of the slicer amplifier output is obtained and adopted as the duty cycle. However, if the numbers of "1"s and "0"s in the data signal differ, the duty cycle cannot be detected correctly based upon the mean value of the slicer amplifier output.

Figure 10:
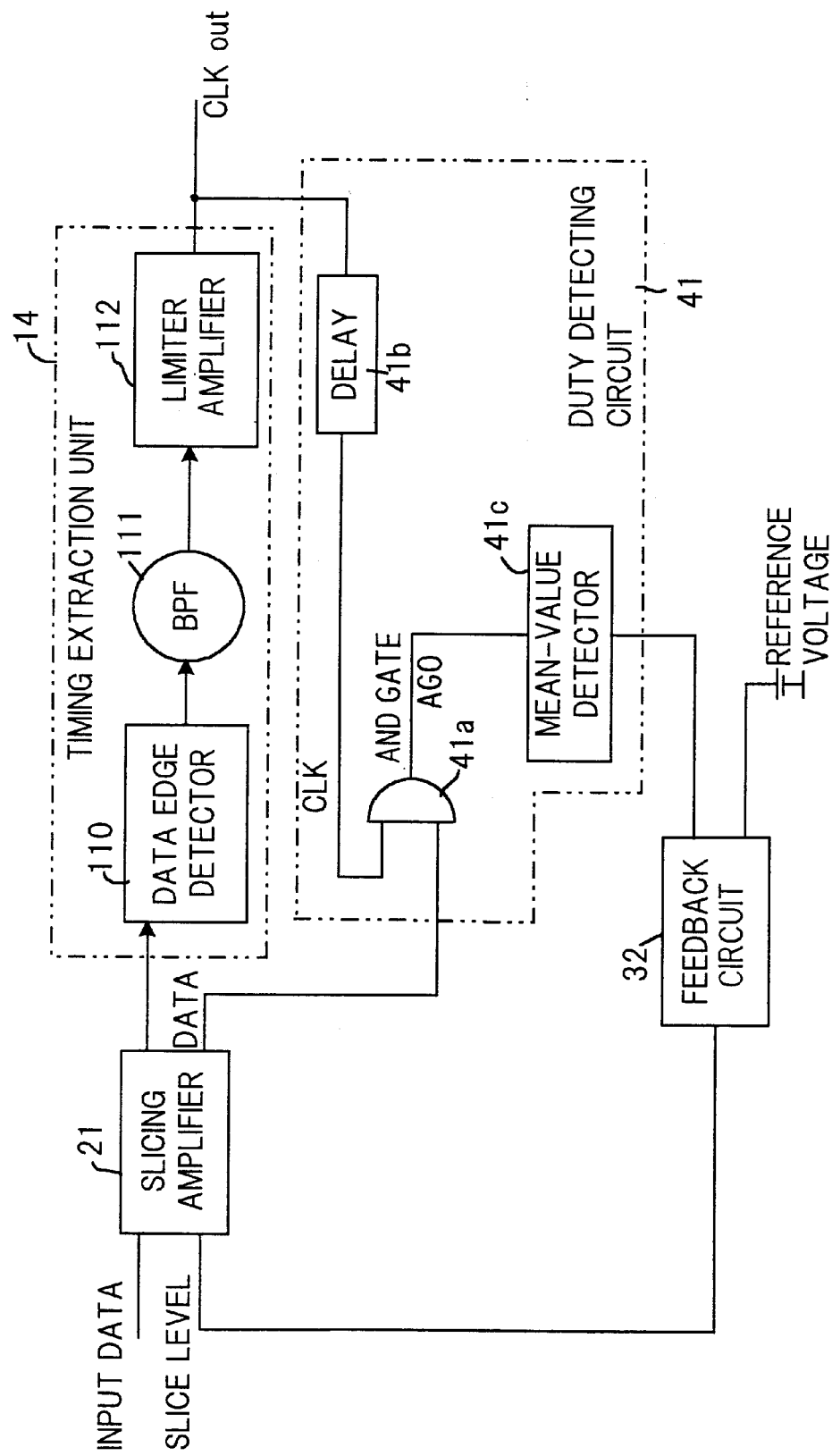
FIG. 10 is a block diagram of a duty cycle detecting circuit using an extracted clock.
Figure 12:
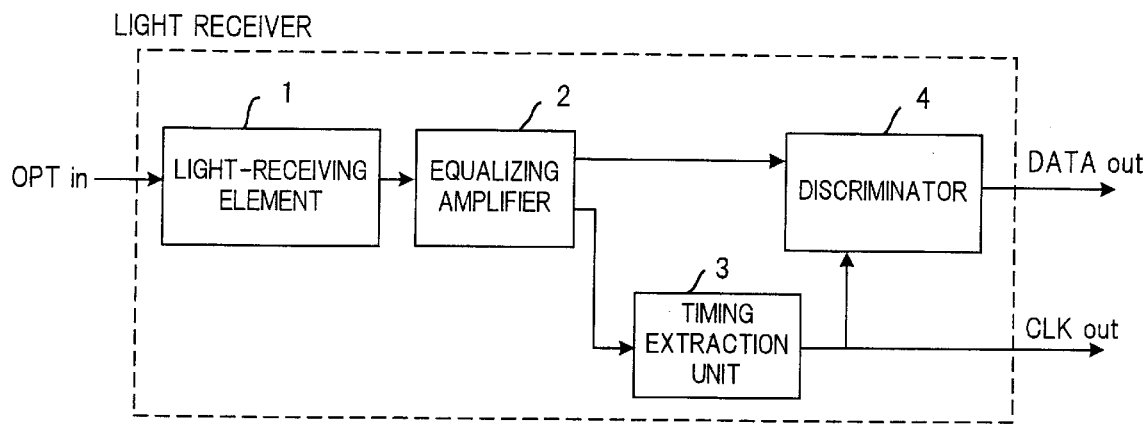
FIG. 12 is a block diagram showing the construction of a light receiver according to the prior art.

FIG. 10 is a block diagram of a duty cycle detecting circuit 41 using an extracted clock. This arrangement makes it possible to improve duty detection accuracy. Also shown in FIG. 10 are the slicer amplifier 21, the timing extraction unit 14 and the feedback circuit 32. The timing extraction unit 14 includes the data edge detector 110, the BPF 111, and the limit amplifier 112, which operate in the same manner as elements 110–112 of the timing extraction unit 3 shown in FIGS. 12 and 13. The duty detecting circuit 41 includes an AND gate 41a for obtaining the logical product between a data signal DATA output by the slicer amplifier 21 and the clock signal CLK output by the timing extraction unit 14, a delay circuit 41b for delaying the clock signal CLK in such a manner that two input signals DATA and CLK of the AND gate 41a will coincide, and a mean-value detecting circuit 41c, such as an integrator, for averaging and outputting the level of a signal AGO output by the AND gate 41a.

Figure 11:
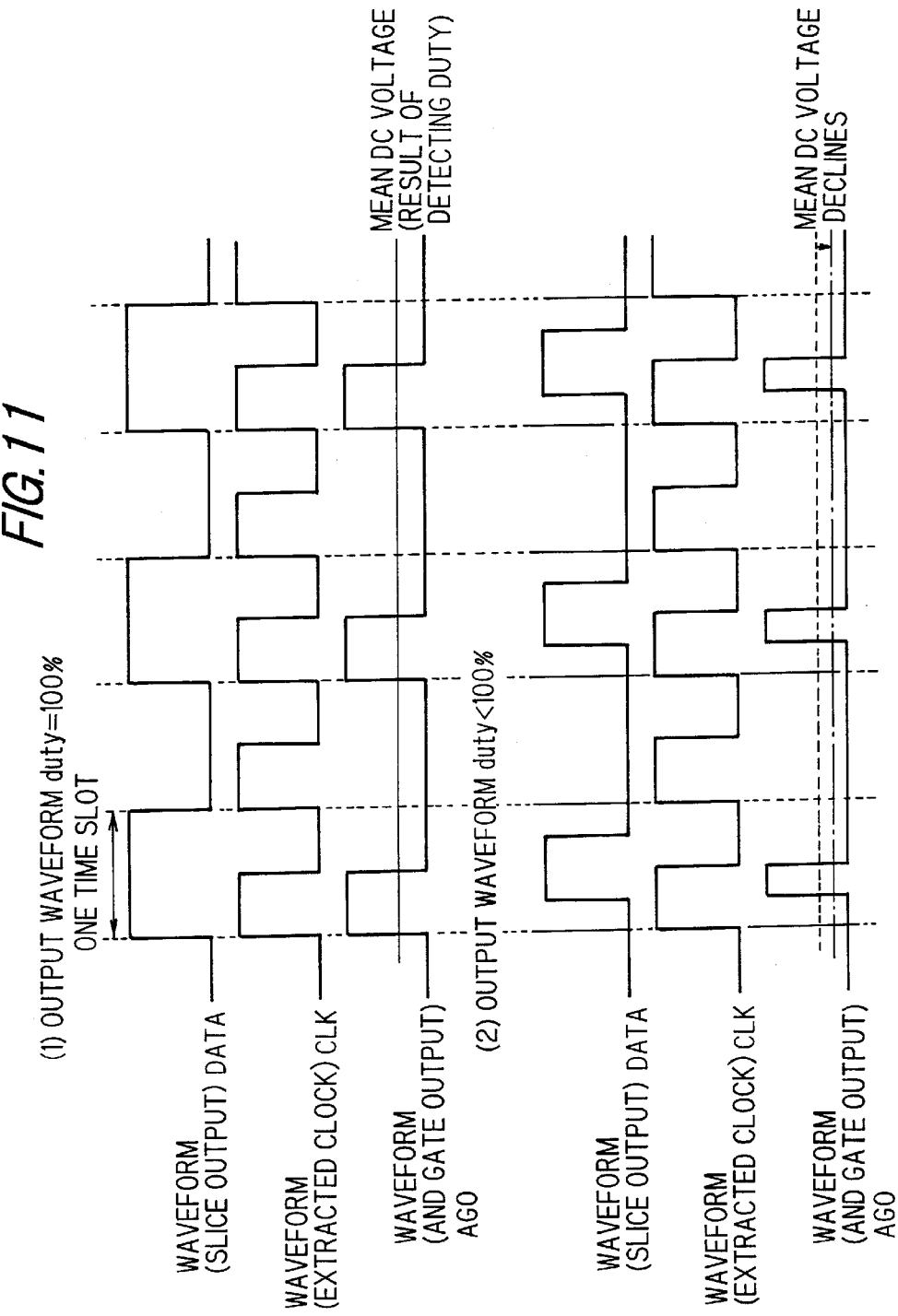
FIG. 11 is a time chart of the duty cycle detecting circuit using the extracted clock.

FIG. 11 is a waveform diagram of the data signal DATA, clock signal CLK and AND gate output signal AGO when duty is 100% and less than 100%. The smaller the duty becomes, the lower the mean level output by the mean-value detector 41c.

With this duty cycle detecting circuit, duty can be detected correctly even if the numbers of "1"s and "0"s are not equal. This makes it possible to reduce duty cycle error caused by feedback control.

In accordance with the present invention, a filter whose upper limited frequency is sufficiently low with respect to the bit rate of data is provided at the input to a timing extraction unit and the data is input to the filter, whereby the duty cycle of the data signal is improved. As a result, a clock signal exhibiting excellent quality can be generated by the timing extraction unit, thereby making it possible to improve data discrimination accuracy.

In accordance with the present invention, a slicer amplifier for varying slice level to improve the duty cycle of the data signal is provided at the input to a timing extraction unit that extracts a clock signal from the data signal, and the data signal is input to the timing extraction unit via the slicer amplifier. As a result, a clock signal exhibiting excellent quality can be generated by the timing extraction unit, thereby making it possible to improve data discrimination accuracy.

In accordance with the present invention, a filter whose upper limited frequency is sufficiently low with respect to the bit rate of data is provided at the input to a slicer amplifier, thereby making it possible to enlarge the amount of duty cycle compensation with respect to slice level so that duty cycle can be improved further.

Further, in accordance with the present invention, control is performed to feed back slice level on the basis of the mean value of the slicer amplifier output. As a result, the duty cycle of the output data signal can be made the optimum value automatically and a clock signal of even better quality can be generated.

Further, in accordance with the present invention, the logical product of the slicer amplifier output and extracted clock signal from the timing extraction unit is obtained and the mean value of the logical product is adopted as the duty cycle. As a result, duty cycle can be detected accurately irrespective of the number of "1"s and "0"s in the data signal. This makes it possible to diminish duty cycle error caused by feedback control.

Further, in accordance with the present invention, a filter whose upper limited frequency is sufficiently low with respect to the bit rate of data is provided at the input to a slicer amplifier the slice level of which is controlled by feedback. As a result, the amount of duty cycle compensation with respect to the slice level can be increased. This makes it possible to increase loop gain and to reduce duty cycle error in the output waveform.

As many apparently widely different embodiments of the present invention can be made without departing from the spirit and scope thereof, it is to be understood that the invention is not limited to the specific embodiments thereof except as defined in the appended claims.

What is claimed is:

1. A clock extraction circuit for extracting a clock signal, which furnishes timing for discriminating a data signal, from the data signal, comprising:

a timing extraction unit to extract the clock signal from the data signal; and a filter having an upper limited frequency sufficiently lower than the bit rate of the data;

wherein the data signal is input to said timing extraction unit via said filter.

2. A clock extraction circuit for extracting a clock signal, which furnishes timing for discriminating a data signal, from the data signal, comprising:

a timing extraction unit to extract the clock signal from the data signal; and a slicer amplifier to vary slice level to improve the duty cycle of the data signal;

wherein the data signal is input to said timing extraction unit via said slicer amplifier.

3. The circuit according to claim 2, further comprising:

a mean-value circuit to output a mean value of an output from said slicer amplifier; and a feedback circuit to control the slice level based upon the mean value to improve the duty cycle of the data signal.

4. The circuit according to claim 2, further comprising:

an AND gate to obtain the logical product of an output from said slicer amplifier and the extracted clock output by said timing extraction unit;

a mean-value circuit to output a mean value of an output from said AND gate; and a feedback circuit to control the slice level based upon the mean value to improve the duty cycle of the data signal.

5. The circuit according to claim 2, further comprising:

a filter, which has an upper limited frequency sufficiently lower than the bit rate of the data;

wherein the data signal is input to said slicer amplifier via said filter.

6. The circuit according to claim 5, further comprising:

a mean-value circuit to output a mean value of an output from said slicer amplifier; and a feedback circuit to control the slice level based upon the mean value to improve the duty cycle of the data signal.

7. The circuit according to claim 5, further comprising:

an AND gate to obtain the logical product of an output from said slicer amplifier and the extracted clock output by said timing extraction unit;

a mean-value circuit to output a mean value of an output from said AND gate; and a feedback circuit to control the slice level based upon the mean value to improve the duty cycle of the data signal.

\* \* \* \* \*